US012729912B2

(12) United States Patent
Sangiovanni et al.

(10) Patent No.: US 12,729,912 B2
(45) Date of Patent: Sep. 8, 2026

(54) DRYER FOR CERAMIC PRODUCTS

(71) Applicant: SYSTEM CERAMICS S.P.A., Fiorano Modenese (IT)

(72) Inventors: Carmine Sangiovanni, Formigine (IT); Eustachio Tarasco, Bologna (IT)

(73) Assignee: SYSTEM CERAMICS S.P.A., Fiorano Modenese (IT)

(*) Notice: Subject to any disclaimer, the term of this patent is extended or adjusted under 35 U.S.C. 154(b) by 743 days.

(21) Appl. No.: 18/006,050

(22) PCT Filed: Aug. 3, 2021

(86) PCT No.: PCT/IB2021/057080
§ 371 (c)(1),
(2) Date: Jan. 19, 2023

(87) PCT Pub. No.: WO2022/029613
PCT Pub. Date: Feb. 10, 2022

(65) Prior Publication Data

US 2023/0349636 A1 Nov. 2, 2023

(30) Foreign Application Priority Data

Aug. 5, 2020 (IT) ........................ 102020000019264

(51) Int. Cl.
*F26B 15/12* (2006.01)
*F26B 3/04* (2006.01)
*F26B 25/00* (2006.01)

(52) U.S. Cl.
CPC ................ *F26B 15/12* (2013.01); *F26B 3/04* (2013.01); *F26B 25/003* (2013.01); *F26B 2210/02* (2013.01)

(58) Field of Classification Search
CPC .......... F26B 15/12; F26B 3/04; F26B 25/003; F26B 2210/02; B65G 43/10;
(Continued)

(56) References Cited

U.S. PATENT DOCUMENTS 4,009,993 A * 3/1977 Marazzi .............. F27D 99/0033
432/236
5,848,483 A 12/1998 Honda et al.
(Continued)

FOREIGN PATENT DOCUMENTS

DE 7244206 12/1975
DE 102007000503 A1 5/2008
(Continued)

OTHER PUBLICATIONS

International Search Report and Written Opinion for corresponding International Application No. PCT/IB2021/057080 mailed Dec. 6, 2021.

*Primary Examiner* — John P Mccormack
(74) *Attorney, Agent, or Firm* — Chrisman Gallo Tochtrop LLC

(57) ABSTRACT

A dryer for ceramic products that includes a casing that encloses a drying chamber with drying channels that have a first movable plane equipped with a motor means provided to transport the ceramic products along a main direction, and a heating means provided to heat the drying chamber. The dryer further includes outlet channels in the drying chamber aligned with a respective drying channel along the main direction and a second mobile plane with a motor means and the motor means of each first mobile plane is activated independently from the motor means of the second mobile plane with which it is aligned.

9 Claims, 3 Drawing Sheets

(58) Field of Classification Search
CPC .... B65G 2203/0233; B65G 2203/0291; B65G 47/31; B65G 47/08
USPC ............. 34/500; 198/461.1, 461.2, 579, 334, 198/341.09, 415, 419.2, 792, 301, 341, 3, 198/341.08, 572, 460.1, 539, 600
See application file for complete search history.

(56) References Cited

U.S. PATENT DOCUMENTS

| | | | | |
|---|---|---|---|---|
| 9,027,738 | B2 * | 5/2015 | Coen | B65G 37/00 198/605 |
| 2005/0072655 | A1 * | 4/2005 | Raque | B65G 47/1492 198/455 |

FOREIGN PATENT DOCUMENTS

| | | | |
|---|---|---|---|
| EP | 0803692 | | 10/1997 |
| WO | 2008069680 | A1 | 6/2008 |

* cited by examiner

DRYER FOR CERAMIC PRODUCTS

The present invention relates to an inlet module for a dryer and a dryer provided with such module.

In particular, the invention relates to a dryer for ceramic tiles or slabs.

In the sector of the production of ceramic tiles and slabs, dryers are currently available that are used to reduce the moisture in products before firing. In summary, the dryer is provided to regulate the moisture in products so that it is not excessive for the firing process. In fact, excessive moisture implies a high risk of the products breaking during firing.

The dryers currently available comprise a series of roller planes, mutually superimposed, on which the products to be dried are positioned. Each roller plane defines a channel of the dryer and one dryer can have one or more superimposed channels. The roller planes are preferably motorised, to lead the products coming from an external transport plane into the channel of the dryer.

A flow of hot air is conveyed into each channel of the dryer, which hits the products, reducing the moisture therein. In current dryers, the hot air is conveyed into each channel through a plurality of tubular terminals, arranged above and below the roller plane of the channel. The terminals are arranged parallel to the rollers that form the roller planes, i.e. they are arranged inside the channel transversally to the advancement direction of the products. For the delivery of the hot air, the terminals are provided with a series of openings distributed on the surface of the terminals themselves. To enable the material to be unloaded from the dryer, an unloading roller is arranged to take charge of a single slab at a time leaving the dryer. The step of taking each slab in charge by the unloading roller takes place at a variable speed. During a first step, the dryer roller and the unloading roller are in motion at low speed, in the order of a few metres per minute. When the tail of the slab leaves the dryer, the unloading roller can relaunch the slab at high speed even reaching various tens of metres per minute. This type of operation implies the temperature not being uniform once the unloading step has been terminated. In particular, the head has a lower temperature than the tail of the slab, because it has had more time to cool down with respect to the tail which has instead remained inside the dryer for more time.

The temperature difference between the head and tail can even reach 20°/30° C. This temperature difference implies various disadvantages, especially in subsequent applications to the drying step, such as during decoration step, in which a different temperature of the slab leads to a non-uniform printing quality because of the different behaviour of the ink which is deposited on the colder or hotter area of the slab.

The same problem also arises with smaller formats like tiles. In practice, at the outlet from the dryer the individual pieces are loaded onto the outlet roller at low speed until the whole roller has taken charge of a maximum number of tiles equal to the maximum loading length of the roller itself. In practice, a maximum length of material which can be contained on a roller is set. Once the maximum set length of material loaded onto the outlet roller has been reached, the roller can evacuate all the tiles at high speed. The temperature difference is not between the head and tail of the individual slab but between the first and the last tile loaded onto the roller.

The object of the present invention is to offer a solution to the technical problems summarised above.

An advantage offered by the present invention is that it enables the temperature of each slab at the outlet from the dryer, or between individual tiles, to be made uniform, preventing a slab having areas at different temperatures or tiles at different temperatures.

Another advantage of the present invention is that it enables the temperature of each slab or tile at the outlet from the dryer to be precisely controlled.

Additional features and advantages of the present invention will become more apparent from the following detailed description of an embodiment of the invention, illustrated by way of non-limiting example in the appended figures, in which.

Figure 1:
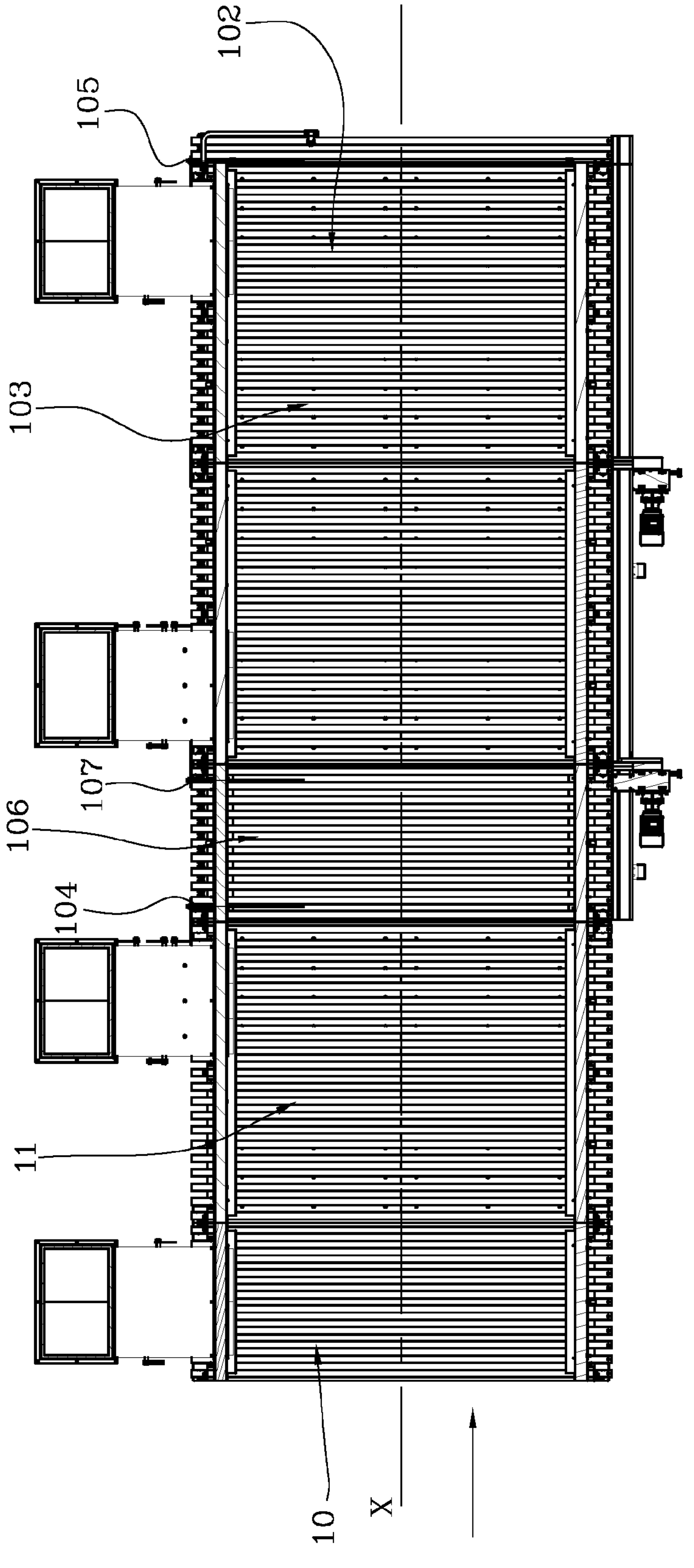
FIG. 1 shows a schematic view from above of an area of the dryer, from which an outer casing has been removed to better highlight the illustrated area.
Figure 2:
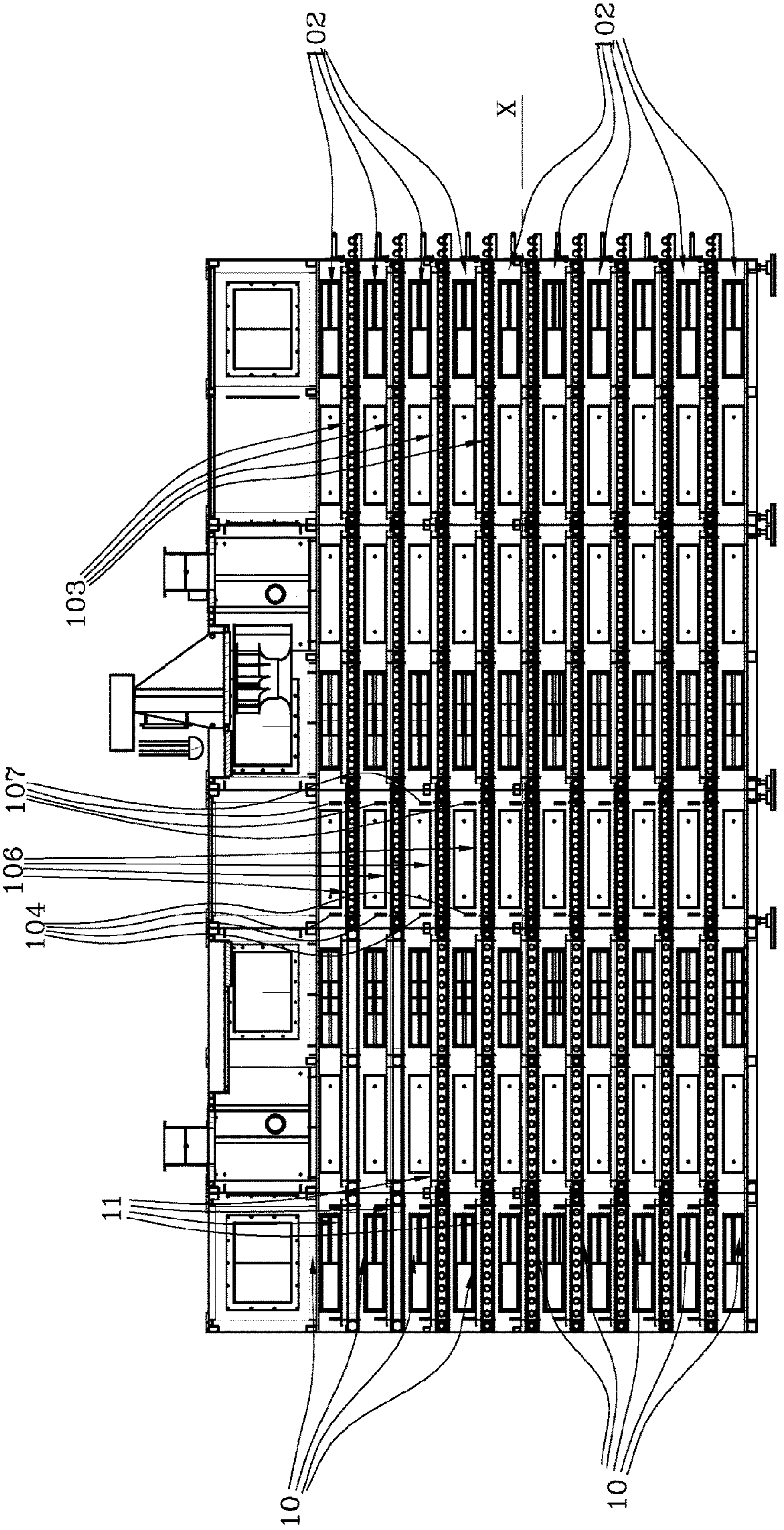
FIG. 2 shows a side view of the dryer of FIG. 1, i.e. a view from below of the view of FIG. 1.
Figure 3:
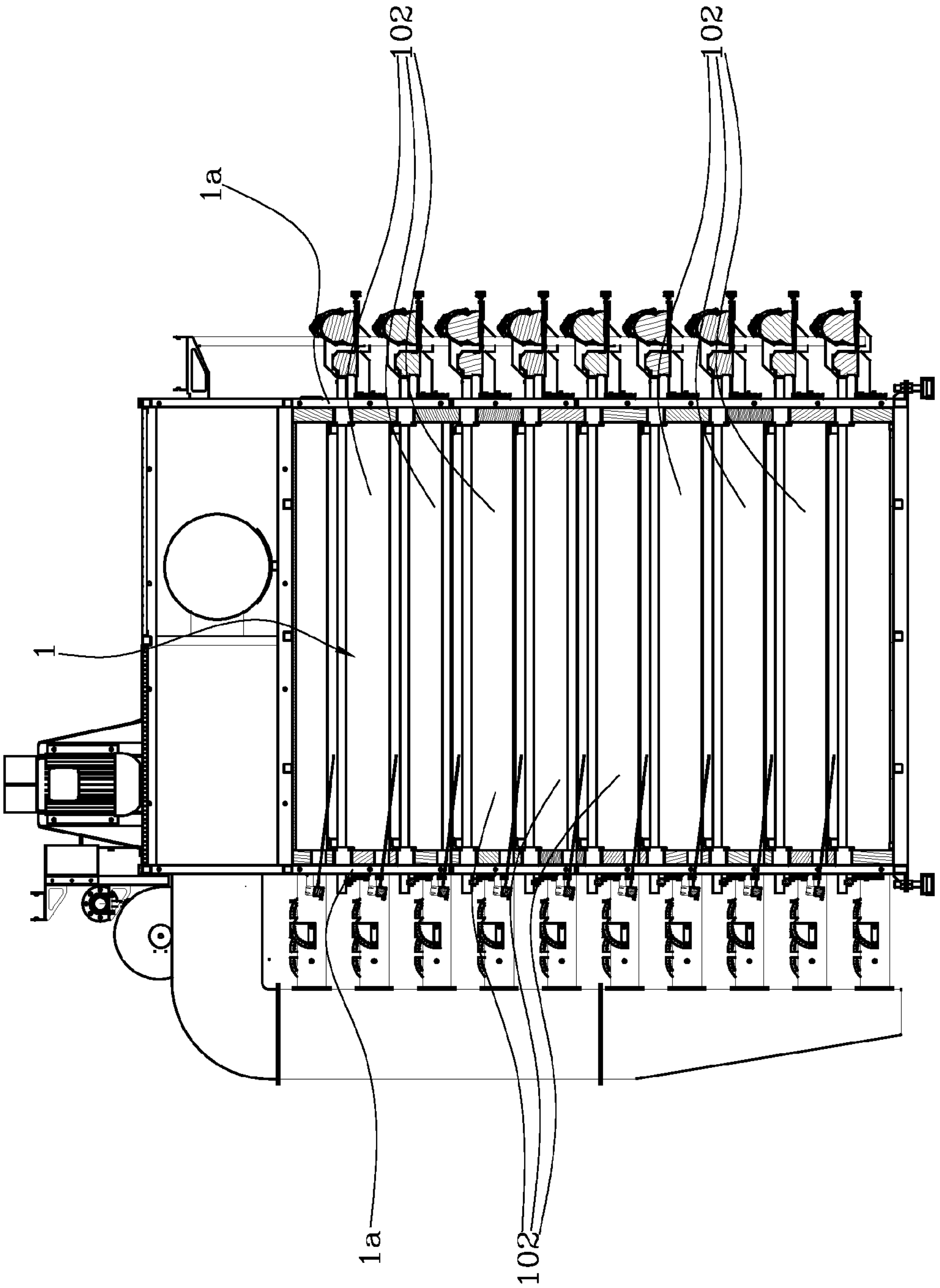
FIG. 3 shows a front view of the dryer according to the present invention, i.e. a view from the left of the view of FIG. 1.

The dryer according to the present invention is particularly effective for performing a drying process, i.e. for reducing the degree of moisture, for ceramic products such as, for example, slabs or tiles. Typically, the dryer performs its function before the firing of ceramic products, to prevent them entering the oven with too high a degree of moisture, i.e. too high a percentage of water. As is known, an excessive degree of moisture can cause the deformation or damage of the ceramic product, due to the formation of vapour bubbles in the mass of the product itself.

The dryer according to the present invention comprises a casing (1*a*) that encloses a drying chamber (1). The casing (1*a*) has thermal insulation characteristics such as to enable the establishment of a controlled atmosphere, at least with reference to moisture and temperature.

The dryer comprises one or more drying channels (10), contained in the drying chamber (1), each of which comprises a first movable plane (11), equipped with a motor means, provided to transport the ceramic products in advancement along a main direction (X). Each drying chamber (10) is provided with an inlet section, to which the ceramic products are supplied in succession. The latter can be supplied to a drying chamber (10) in sequence, i.e. one after the other, such as in the case of large slabs which have a width, measured perpendicularly to the main direction (X), comparable to the width of the drying channel (10). In the case of ceramic products of lower dimensions, the latter may be supplied to a drying channel in rows, parallel to the main direction (X) and separated by a predefined distance. Along the same row, the products are spaced out by a predefined pitch, along the main direction (X).

A heating means is provided to heat the drying chamber (1). Such heating means comprises, for example, one or more burners or other heat generators. Preferably, the heating means is suitable to produce a flow rate of hot air which, through a series of conduits, is supplied to various areas of the drying chamber (1) and/or of the drying channels (10).

Advantageously, the dryer according to the present invention comprises one or more outlet channels (102), each of which is aligned with a respective drying channel (10) along the respective main direction (X). Preferably, each outlet channel (102) defines the continuation of the drying channel (10) with which it is aligned.

Each outlet channel (102) comprises a second mobile plane (103), provided with its own motor means, which is aligned along the main direction (X) with the mobile plane (11) of the respective drying channel (10). The motor means of each first mobile plane (11) can be activated independently from the motor means of the second mobile plane (103) with which it is aligned. For example, the motor means of the first mobile plane (11) and of the second mobile plane (103) can be activated to produce different advancement speeds. As will be better described below, this is very useful for enabling the rapid outlet of the ceramic products from the drying chamber (1), through the outlet channels (102).

Each second mobile plane (103) has an outlet section, i.e. an end segment, which ends in proximity or at an outlet area of the drying channel (10). In other words, each second mobile plane (103) is arranged to lead the ceramic products out of the drying chamber (1).

A control module is provided to regulate the advancement speed of the first mobile plane (11) and of the second mobile plane (103).

Advantageously, the control module is provided, through a control algorithm, to perform a speed cycle for moving the ceramic products. Such speed cycle substantially comprises a first step, during which the products pass from a drying channel (10) to an outlet channel (102) aligned with the drying channel (10). During this first step, the mobile planes (11, 103) are activated at a same first advancement speed, which is substantially the advancement speed envisaged for the drying channel (10), i.e. the advancement speed defined to enable the completion of the ceramic product drying process. The speed cycle further envisages a second step, subsequent to the first, which is activated when a ceramic product has completed the step from the drying channel (10) to the outlet channel (102), i.e. when the product leaves the mobile plane (11) of the drying channel (10) and is totally arranged on the second mobile plane (103) of the outlet channel. During such second step, the motor means of the second mobile plane (103) are activated at a second speed, greater than the first, producing an acceleration of the ceramic product to a notably greater outlet speed with respect to the speed assumed during the first step. Such second speed or outlet speed is such as to enable the rapid outlet of the product from the drying chamber. In other words, the outlet speed is such as to minimise the time interval that passes between the outlet of the head of the ceramic product and the outlet of the tail of the product from the drying chamber (1). The lower the time interval, the lower the risk that the head area and the tail area of the product are at a very different temperature from one another.

In other words, preferably, the control module is provided to regulate the advancement speed of each first mobile plane (11) and of each second mobile plane (103) so as to minimise the time necessary for a ceramic product to cross the respective outlet channel (102) and to exit from the drying chamber (1).

Preferably, a first detector (104) is provided for each second mobile plane (103). There may be a single first detector (104) operating simultaneously on each second mobile plane (103), or each second mobile plane (103) may be provided with its own first detector (104).

All the detectors (104, 105, 107) mentioned, as well as being of the on/off type or part counters, can also be configured to read a width according to the speed set for the first and the second mobile plane (11, 103). In practice, when a detector (104, 105, 107) is blacked out, the control module begins to detect the length of the tile or slab and stops detecting the width when the detector itself is no longer blacked out by a piece or slab. Once the total predefined length is reached, it means that the maximum capacity of material has been reached on the relative mobile plane (11, 106, 103) and it is possible to move onto the next step.

The first detector (104) is suitable to detect the presence of a portion of a ceramic product at an outlet section of the first mobile plane (11), and to process a corresponding signal. Preferably, such signal processed by the first detector (104) can be a positive signal, to indicate the presence of at least one portion of a ceramic product in the action radius of the first detector (104), or a negative signal, to indicate the absence of a ceramic product in the action radius of the first detector (104). The first detector (104) is connected to the control module, to communicate to the latter the positive or negative processed signal.

The control module is programmed to operate in the following ways.

When the first detector (104) detects the presence of a portion of a ceramic product, the control module is provided to activate the first mobile plane (11) and the second mobile plane (103) at the first speed. The presence of a portion of a ceramic product in the action radius of the first detector (104) in fact signifies the presence of a product that is transiting, or is about to transit, from the first mobile plane (11) to the second mobile plane (103). Under such conditions the first and the second mobile plane are activated at the same speed, so that the ceramic product does not undergo any slipping or bouncing. In other words, by advancing along the first mobile plane (11), a product enters the action radius of the first detector (104) initially with a head area, then gradually with the remaining areas, until a tail area. From the moment at which the product enters the action radius of the first detector (104), and until the tail area of the product abandons the action radius of the first detector (104), the control module receives a positive signal, and activates the first mobile plane (11) and the second mobile plane (103) at the same speed.

When the first detector (104) does not detect the presence of a portion of a ceramic product, the control module is provided to increase the speed of the second mobile plane (103) to the second speed, until the outlet of the product from the outlet channel (102) or until the end part of the second mobile plane (103). The absence of a ceramic product in the action radius of the first detector (104) in fact signifies that either a ceramic product has abandoned the first mobile plane (11), and is therefore resting on the second mobile plane (103) only, or no product is about to pass from the first mobile plane (11) to the second mobile plane (103). In other words, when the advancing product abandons the action radius of the first detector (104), the control module receives a negative signal.

Under such conditions, the second mobile plane (103) can be accelerated to the second speed, greater than the first speed, at which the ceramic products can be led to the outlet of the outlet channel (102) along which they are travelling. Such second speed or outlet speed is sufficiently high as to enable the outlet of the ceramic product in a sufficiently contained time, so as not to cause substantial non-uniformity in the temperature of each product.

The drying of a ceramic product takes place through the following steps:

translating a ceramic product in advancement along a main direction (X) along at least one drying channel (10), contained in a drying chamber (1), which is equipped with a first mobile plane (11) and is followed by an outlet channel (102), equipped with a second mobile plane (103), coplanar and aligned with the first mobile plane (11);

activating the first mobile plane (11) and the second mobile plane (103) at a first advancement speed along a main direction (X), for transferring the ceramic product from the first mobile plane (11) to the second mobile plane (103);

when the ceramic product completely or at least partially abandons the first mobile plane (11), activating the second mobile plane (103) at a second advancement speed, greater than the first advancement speed. At least in part it is preferably intended that the ceramic product has abandoned the first mobile plane (11) for at least ½ its own length.

Preferably, for each second mobile plane (103) an outlet detector (105) is provided. There may be a single outlet detector (105) operating simultaneously on each second mobile plane (103), or each second mobile plane (103) may be provided with its own outlet detector (105).

The outlet detector (105) is provided to detect the presence of a portion of a ceramic product at an outlet section of the second mobile plane (103), and to process a corresponding signal. Preferably, such signal processed by the outlet detector (105) can be a positive signal, to indicate the presence of at least one portion of a ceramic product in the action radius of the outlet detector (105), or a negative signal, to indicate the absence of a ceramic product in the action radius of the outlet detector (105). The outlet detector (105) is connected to the control module, to communicate to the latter the positive or negative processed signal. The passage of the signal of the outlet detector (105) from positive to negative substantially indicates that a product has abandoned the second mobile plane (103), or that it has left the outlet channel (102) along which it was travelling. The passage of the signal of the outlet detector (105) from positive to negative can be used by the control module to provide consent for further operations, or to activate a subsequent cycle of operations.

Preferably, each second mobile plane (103) is preceded by an inlet segment (106), arranged consecutively to a respective first mobile plane (11). In other words, the inlet segment (106) is interposed between the first mobile plane (11) and the second mobile plane (103). Preferably, the first mobile plane (11), the inlet segment (106) and the second mobile plane (103) are coplanar to one another and are aligned along the main direction (X). The inlet segment (106) is structured to enable the free sliding of the ceramic products. In other words, the inlet segment (106) is structured not to obstruct the sliding of the ceramic products along the main direction (X).

By not obstructing the transit of the ceramic products, the inlet segment (106) can be surmounted simultaneously by the tail area of a first ceramic product which has abandoned the first mobile plane (11), and by the head area of a subsequent ceramic product, coming from the first mobile plane (11) and which is still located at least partially on the first mobile plane (11). The first ceramic product can be accelerated to the outlet speed, through a corresponding command to the second mobile plane (103). The tail of the first ceramic product is pulled forwards, sliding freely on the inlet segment (106). The acceleration imparted to the first ceramic product does not affect the head area of the subsequent ceramic product, which is pushed forward by the first mobile plane (11).

The presence of the inlet segment (106) enables the distance to be substantially reduced, measured along the main direction (X), which separates two consecutive ceramic products. In fact, the inlet segment (106), which enables the free sliding of the ceramic products, is able to simultaneously support the tail area of a first ceramic product, which advances along the second mobile plane (103) at the second speed, and the head area of a second ceramic product coming from a first mobile plane (11), which moves at the first speed. Under such conditions, the tail area of the first ceramic product moves gradually away from the head area of the second ceramic product. Along the first mobile plane (11), two ceramic products can therefore be placed at a sufficient distance to enable the first ceramic product to travel fully along the second mobile plane (103), activated at the second speed, before the second ceramic product engages the second mobile plane (103), which must be brought back to the first speed.

In the absence of the inlet segment (106), the ceramic products must instead be supplied to the first mobile plane (11) separated by a distance, measured along the main direction (X), such as to enable a first ceramic product to travel fully along the second mobile plane (103), at the second speed, before a second ceramic product engages in turn the second mobile plane (103) at the first speed.

In other words, the inlet segment (106) enables two ceramic products transiting from the first mobile plane (11) to the second mobile plane (103) to be placed at a predefined distance. In particular, the inlet segment (106) enables the pitch that separates two consecutive ceramic products transiting from the first mobile plane (11) to the second mobile plane (103) to be increased. This is possible within the scope of the speed cycle already described with reference to the control module that operates based on the signal received by the first detector (104).

For that purpose, the inlet segment (106) can comprise low friction sliding surfaces, or idle sliding planes.

In a possible embodiment, the inlet segment (106) comprises two or more idle rollers. Such idle rollers may be free, i.e. may directly support the ceramic products, or may act as a guide for a conveyor belt or mat.

In another possible embodiment, which enables the distance between two consecutive ceramic products to be reduced, the inlet segment (106) comprises its own motor means, controlled independently with respect to the motor means of the first mobile plane (11) and of the second mobile plane (103). In this embodiment, a second detector (107) is provided in an outlet section of the inlet segment (106). With respect to the advancement direction of the first and second mobile plane (11, 103), the second detector (107) is arranged downstream of the first detector (104). There may be a single second detector (107) operating simultaneously on each inlet segment (106), or each inlet segment (106) may be provided with its own second detector (107).

The second detector (107) is suitable to detect the presence of a portion of a ceramic product at an outlet section of the inlet segment (106), and to process a corresponding signal. Preferably, such signal processed by the second detector (107) can be a positive signal, to indicate the presence of at least one portion of a ceramic product in the action radius of the second detector (107), or a negative signal, to indicate the absence of a ceramic product in the action radius of the second detector (107). The second detector (107) is connected to the control module, to communicate to the latter the positive or negative processed signal.

In the presence of the second detector (107), the control module operates in the following ways.

As already indicated, when the first detector (104) detects the presence of a portion of a ceramic product, the control module is provided to activate the first mobile plane (11) and the second mobile plane (103) at the first speed. In this case, when the first detector (104) detects the presence of a portion of a ceramic product, the inlet segment (106) is also activated at the first speed, together with the first mobile plane (11) and with the second mobile plane (103). The product therefore starts to be transferred from the first mobile plane (11) to the inlet segment (106) and from the latter to the second mobile plane (103). Proceeding forwards, the product enters the action radius of the second detector (107).

When the first detector (104) no longer detects the presence of a portion of a ceramic product, or when the product abandons the action radius of the first detector (104), the control module is provided to increase the speed of the inlet segment (106) and of the second mobile plane (103) at the second speed, until the outlet of the product from the outlet channel (102). The advancing product then also abandons the action radius of the second detector (107). When the second detector (107) does not detect the presence of a portion of a ceramic product, the control module is provided to slow down the inlet segment (106) to the first speed, while the second mobile plane (103) continues at the second speed or outlet speed.

In other words, while the product is advancing, at a certain point the second detector (107) stops detecting the product and sends the control module the corresponding negative signal. The control module then provides to slow down the inlet segment (106) to the first speed, while the second mobile plane (103) continues at the second speed or outlet speed.

The presence of the inlet segment (106) provided with its own motor means enables the distance to be substantially reduced, measured along the main direction (X), which separates two consecutive ceramic products. As already underlined, in the absence of the inlet segment (106), the ceramic products must instead be supplied to the first mobile plane (11) separated by a distance, measured along the main direction (X), such as to enable a first ceramic product to travel fully along the second mobile plane (103), at the second speed, before a second ceramic product engages in turn the second mobile plane (103) at the first speed.

In the presence of the inlet segment (106) provided with its own motor means, two ceramic products can therefore be placed, along the first mobile plane (11), at a sufficient distance to enable the first ceramic product to travel fully along the second mobile plane (103), activated at the second speed, before the second ceramic product engages the second mobile plane (103), which must be brought back to the first speed. Before this happens, the inlet segment (106) slows down to the first speed, to accept the second ceramic product coming from the first mobile plane (11).

In this embodiment, the drying of a ceramic product takes place through the following steps:

activating the first mobile plane (11), the second mobile plane (103) and the inlet segment (106) at a first advancement speed along a main direction (X), for transferring the ceramic product from the first mobile plane (11) to the second mobile plane (103);

when the ceramic product completely abandons the first mobile plane (11), activating the inlet segment (106) and the second mobile plane (103) at a second advancement speed, greater than the first advancement speed;

when the ceramic product completely abandons the inlet segment (106), activating the inlet segment (106) at the first advancement speed.

The invention claimed is:

1. A dryer for ceramic products comprising:

a casing (la) that encloses a drying chamber (1);

one or more drying channels (10), contained in the drying chamber (1), each of which comprises a first mobile plane (11), equipped with a motor means, provided to transport the ceramic products along a main direction (X);

a heating means, provided to heat the drying chamber (1);

one or more outlet channels (102), contained in the drying chamber (1), each of which is aligned with a respective drying channel (10) along the respective main direction (X) and comprises a second mobile plane (103), equipped with a motor means, aligned along the main direction (X) to a respective mobile plane (11) of a drying channel (10), wherein the motor means of each first mobile plane (11) can be activated independently from the motor means of the second mobile plane (103) with which it is aligned;

a control module, provided to regulate the advancement speed of the first mobile plane (11) and of the second mobile plane (103);

wherein for each second mobile plane (103) a first detector (104) is provided, connected to the control module, which is provided to detect the presence of a portion of a ceramic product at an inlet section of the second mobile plane (103), and to process a corresponding signal, wherein when the first detector (104) detects the presence of a portion of a ceramic product coming from the first mobile plane (11), the control module is provided to activate the first mobile plane (11) and the second mobile plane (103) at a same first speed, wherein when the first detector (104) does not detect the presence of a portion of a ceramic product, the control module is provided to activate the second mobile plane (103) at a second speed, greater than the first speed, up to the outlet of the product from the outlet channel (102), wherein each second mobile plane (103) comprises an inlet segment (106), arranged consecutively to a respective first mobile plane (11), structured to enable the free sliding of the ceramic products, and wherein the inlet segment (106) is equipped with a motor means that can be activated by the control module independently with respect to the motor means of the first and of the second mobile plane (11, 103).

2. The dryer according to claim 1, wherein the control module is provided to regulate the advancement speed of each first mobile plane (11) and of each second mobile plane (103) so as to minimize the time necessary for a ceramic product to cross the respective outlet channel (102) and to exit from the drying chamber (10).

3. The dryer according to claim 1, wherein each inlet segment (106) comprises a second detector (107), connected to the control module, which is arranged in an outlet section of the inlet segment (106) and is provided to detect the presence of a portion of a ceramic product at an outlet section of the inlet segment (106), and to process a corresponding signal;

when the first detector (104) detects the presence of a portion of a ceramic product, the inlet segment (106) is activated at the first speed, together with the first mobile plane (11);

when the first detector (104) does not detect the presence of a portion of a ceramic product, the control module is provided to increase the speed of the inlet segment (106) and of the second mobile plane (103) at the second speed;

when the second detector (107) does not detect the presence of a portion of a ceramic product, the control module is provided to slow down the inlet segment (106) to the first speed, while the second mobile plane (103) continues at the second speed or outlet speed.

4. The dryer according to claim 1, wherein each second mobile plane (103) comprises an inlet segment (106), arranged consecutively to a respective first mobile plane (11), structured to enable the free sliding of the ceramic products.

5. The dryer according to claim 4, wherein the inlet segment (106) comprises one or more idle rollers.

6. The dryer according to claim 1, wherein, for each second mobile plane (103), an outlet detector (105) is provided, for detecting the presence of a portion of a ceramic product at an outlet section of the second mobile plane (103), and for processing a corresponding signal.

7. A method for drying a ceramic product in the dryer of claim 1, comprising the following steps:

translating a ceramic product in advancement along a main direction (X) along the one or more drying channels (10), contained in the drying chamber (1), which is equipped with the first mobile plane (11) and is followed by the outlet channel (102), equipped with the second mobile plane (103), coplanar and aligned with the first mobile plane (11);

activating the first mobile plane (11) and the second mobile plane (103) at the first advancement speed along a main direction (X), for transferring the ceramic product from the first mobile plane (11) to the second mobile plane (103);

when the ceramic product completely or at least partially abandons the first mobile plane (11), activating the second mobile plane (103) at the second advancement speed.

8. The method according to claim 7, wherein the second mobile plane (103) is preceded by an inlet segment (106), interposed between the first mobile plane (11) and the second mobile plane (103), which is structured to enable the free sliding of the ceramic products.

9. The method according to claim 7, wherein the second mobile plane (103) is preceded by an inlet segment (106), interposed between the first mobile plane (11) and the second mobile plane (103), which can be activated independently with respect to the first mobile plane (11) and the second mobile plane (103), comprising the following steps:

activating the first mobile plane (11), the second mobile plane (103) and the inlet segment (106) at the first advancement speed along a main direction (X), for transferring the ceramic product from the first mobile plane (11) to the second mobile plane (103);

when the ceramic product completely or at least partially abandons the first mobile plane (11), activating the inlet segment (106) and the second mobile plane (103) at the second advancement speed;

when the ceramic product completely abandons the inlet segment (106), activating the inlet segment (106) at the first advancement speed.

* * * * *